Sept. 22, 1931.　　　C. H. JACOBS ET AL　　　1,824,550
CARGO CARRIER FOR AIRCRAFT
Original Filed Sept. 10, 1925　4 Sheets-Sheet 1
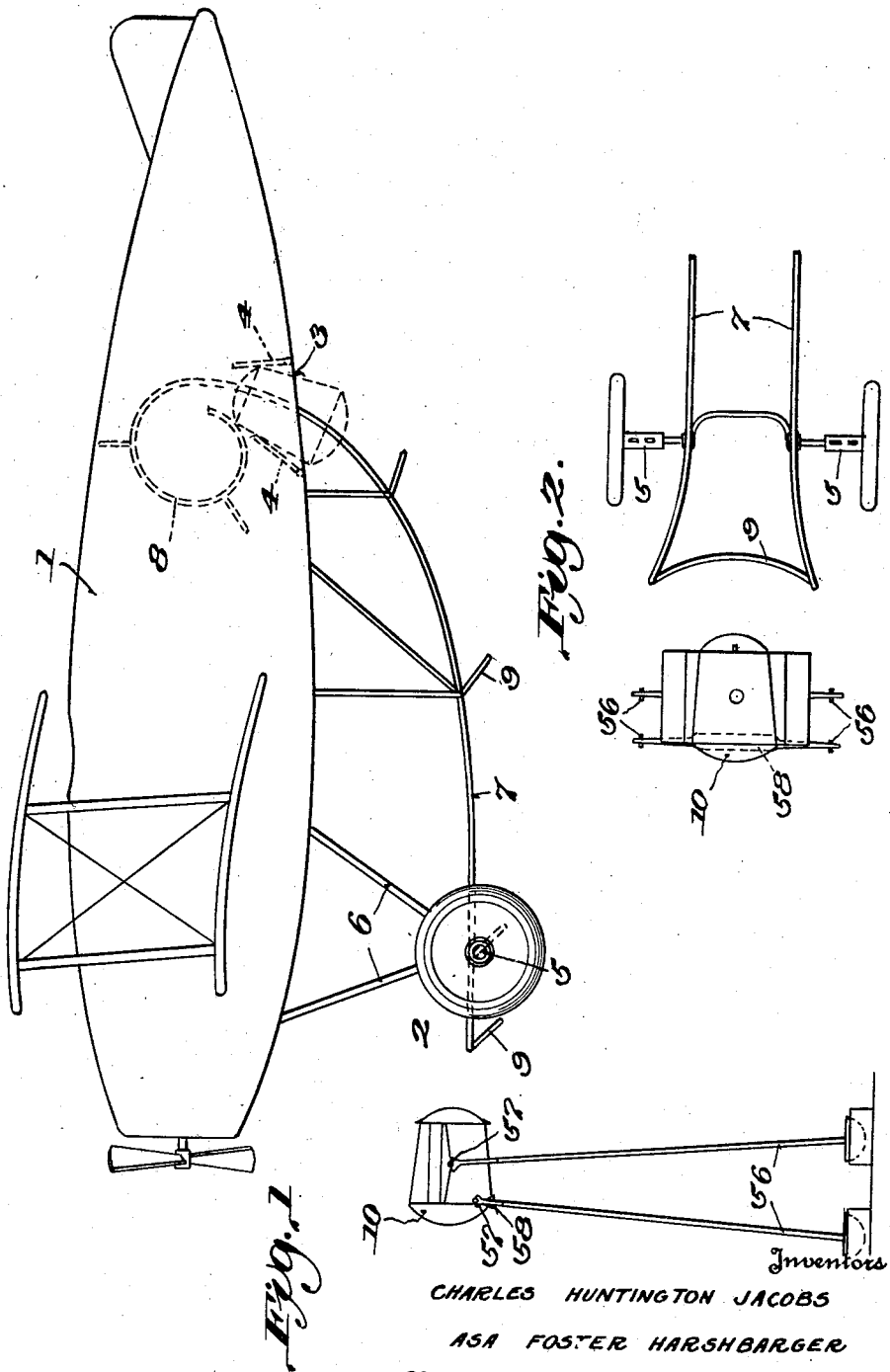
Inventors
CHARLES HUNTINGTON JACOBS
ASA FOSTER HARSHBARGER
By L D Underwood
Attorney

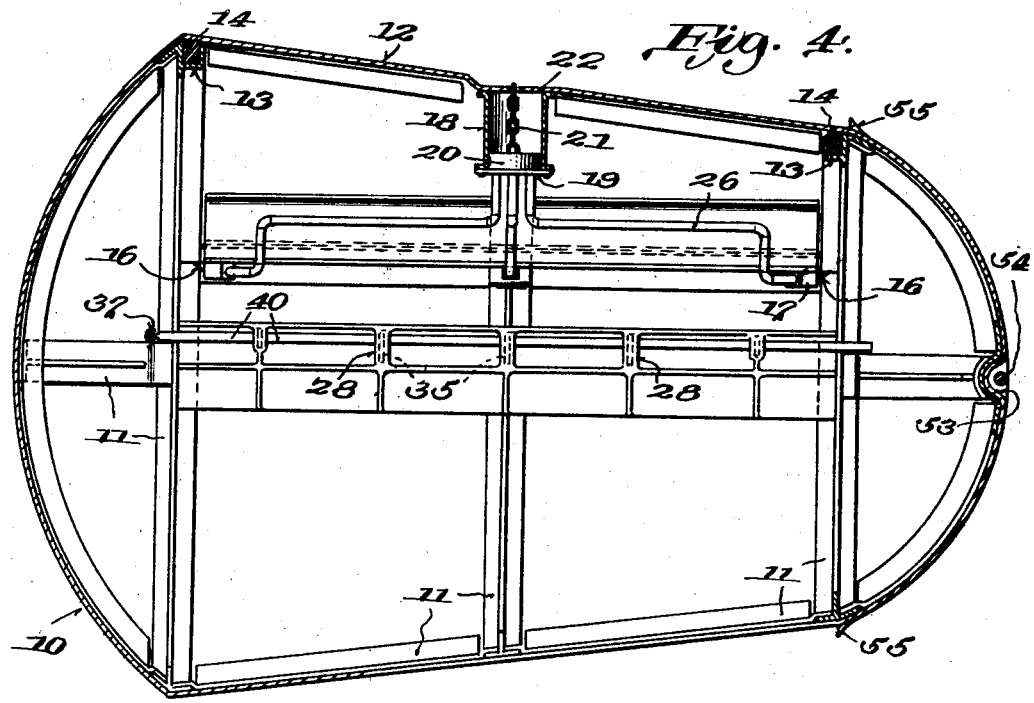
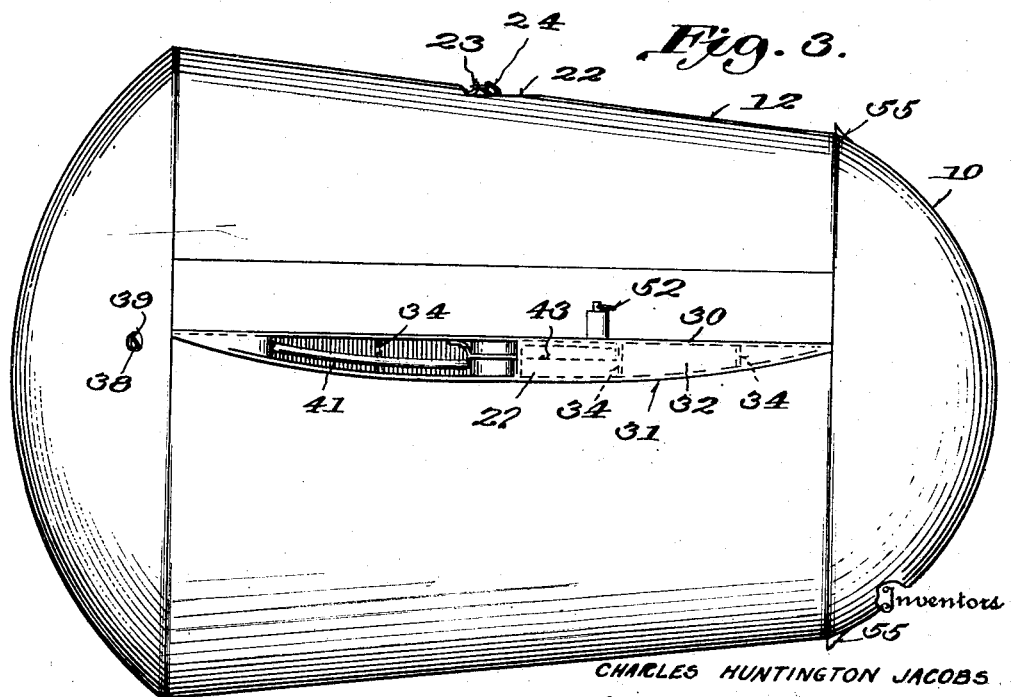

Sept. 22, 1931.  C. H. JACOBS ET AL  1,824,550
CARGO CARRIER FOR AIRCRAFT
Original Filed Sept. 10, 1925   4 Sheets-Sheet 3

Inventors
CHARLES HUNTINGTON JACOBS
ASA FOSTER HARSHBARGER
By L. D. Underwood
Attorney Sept. 22, 1931.    C. H. JACOBS ET AL    1,824,550
CARGO CARRIER FOR AIRCRAFT
Original Filed Sept. 10, 1925    4 Sheets-Sheet 4
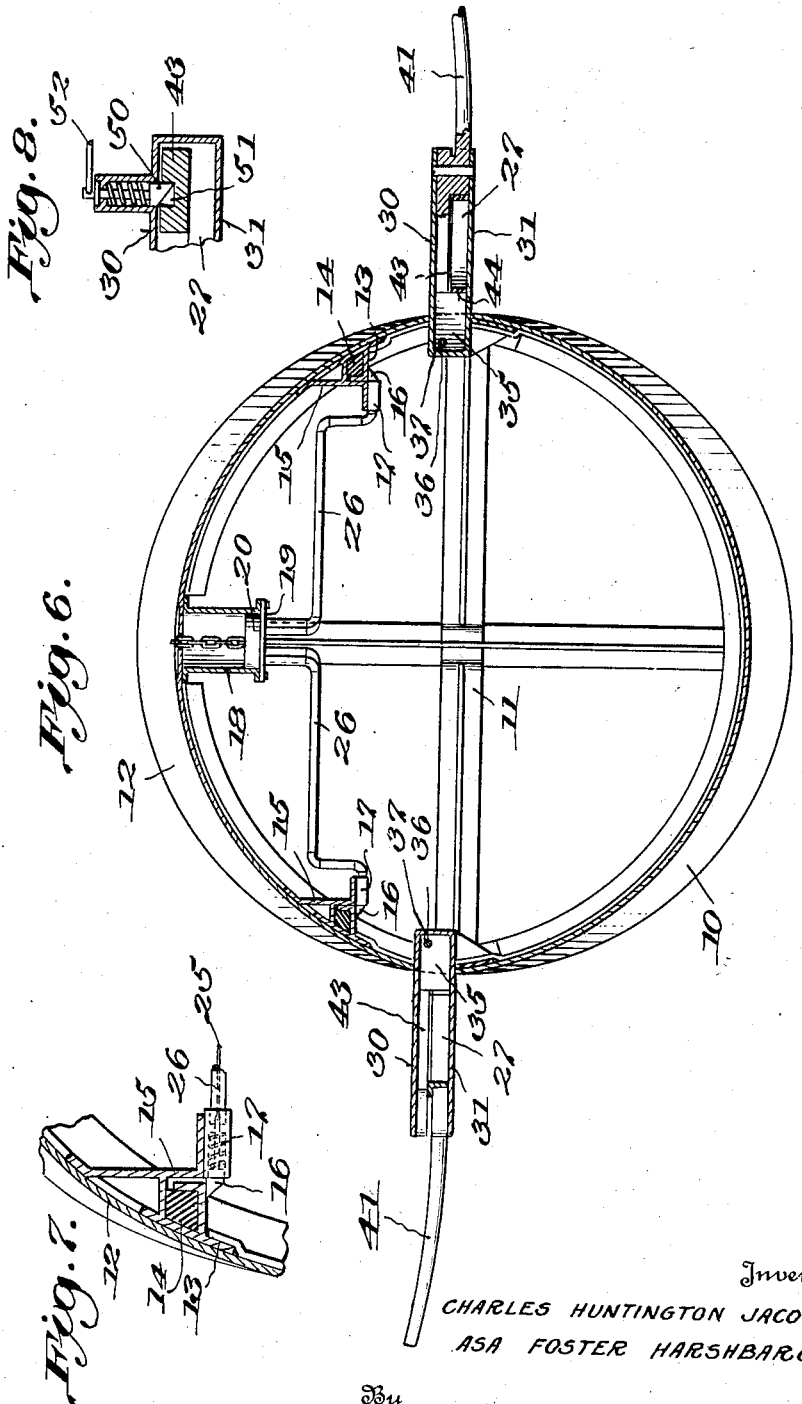
Inventors
CHARLES HUNTINGTON JACOBS
ASA FOSTER HARSHBARGER
By L. D. Underwood
Attorney Patented Sept. 22, 1931

1,824,550

UNITED STATES PATENT OFFICE

CHARLES HUNTINGTON JACOBS, OF SAN FRANCISCO, AND ASA F. HARSHBARGER, OF OAKLAND, CALIFORNIA

CARGO CARRIER FOR AIRCRAFT

Original application filed September 10, 1925, Serial No. 55,504. Divided and this application filed December 26, 1929. Serial No. 416,630.

The invention relates to a cargo carrier adapted to be loaded into aircraft.

The object of the invention is to provide a cargo carrier of a construction suitable to receive mail, merchandise, oil, or other matter to be transported by aircraft, adapted to be automatically engaged by a part of the aircraft while it is in motion and carried into the fuselage thereof.

This cargo carrier is especially adapted for cooperation with a loading attachment for airplanes of novel construction, disclosed in our application Serial No. 55,504, filed Sept. 10, 1925, of which this application is a division, although it may be useful in other relations.

The invention consists in the features hereinafter described and claimed, and illustrated in the annexed drawings, in which, Fig. 1 is a diagrammatic side elevation of an airplane equipped with the loading device forming the subject-matter of our parent application, and our cargo carrier supported for engagement thereby.

Fig. 2 is a top plan of the front portion of the track of the loading device shown in Fig. 1, about to engage the cargo carrier of our invention;

Fig. 3 is a side elevation of the cargo carrier;

Fig. 4 is a cross-section thereof on line 4—4 of Fig. 5;

Fig. 6 is a cross-section through the carrier on line 6—6 of Fig. 5;

Fig. 7 is a detail sectional view showing the latch for locking the cover of the cargo carrier; and Fig. 8 is a detail sectional view showing the latch for holding the supporting arms of the cargo carrier in their folded position.

Figure 5:
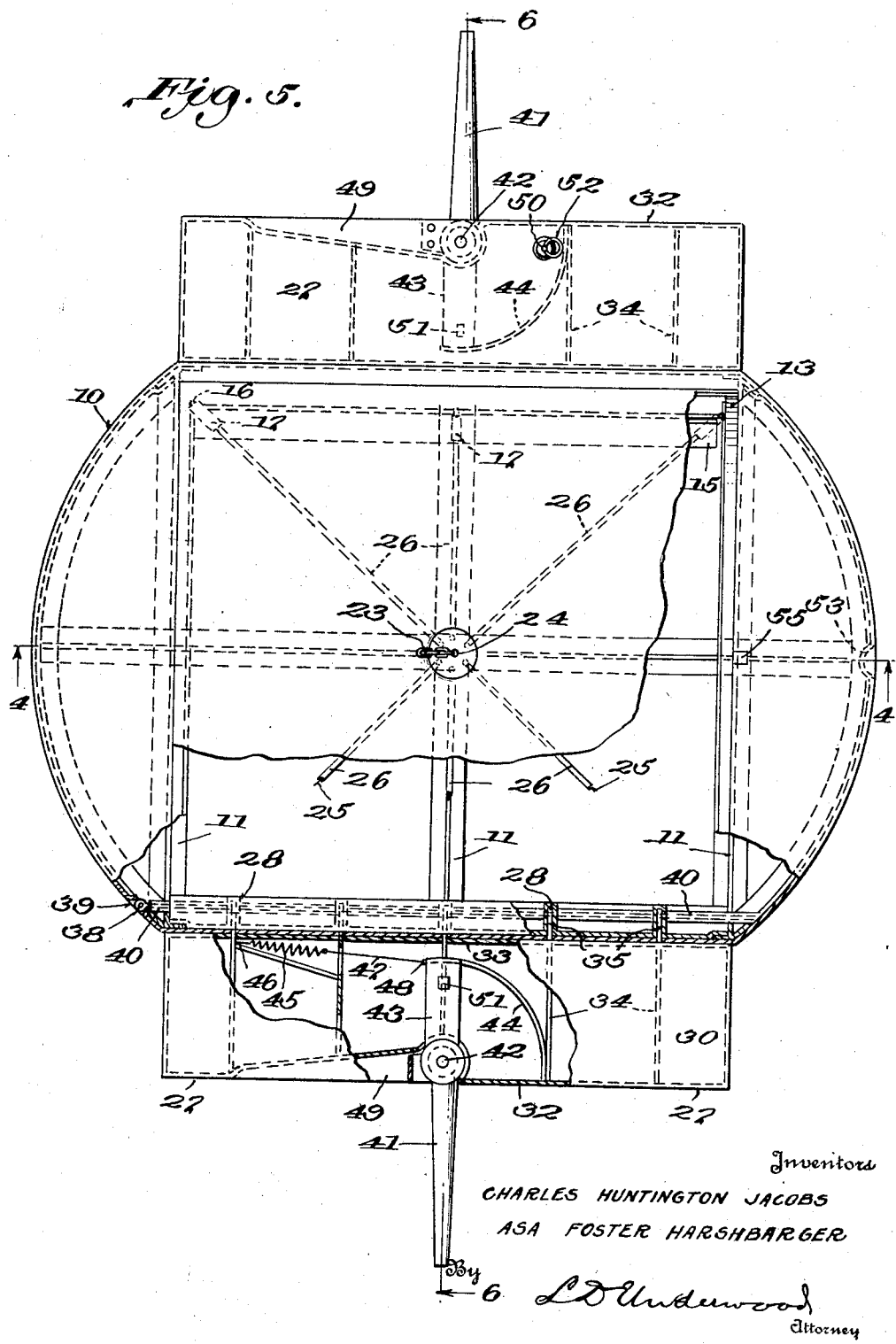
Fig. 5 is a top plan view of the carrier, partly in section, to show more clearly one of the wings thereof.

Referring to the drawings in detail, an airplane 1, having a landing gear 2, is provided with an opening 3, at the bottom of the fuselage near its rear end, closed by a trap door 4. Axles 5 of the landing gear are supported from the fuselage by suitable braces 6. A suitable conveyor or track is provided, which may consist of two rails 7, secured to the lower part of the fuselage and extending from a point slightly in front of the axles of the landing gear rearwardly and upwardly through the opening 3 in the fuselage. The rear ends of the rails are formed into a loop or ram's horn inside the fuselage, as shown at 8. The rails are suitably braced by members 9.

The construction above described forms no part of the present invention, but is set out merely to show the construction with which the cargo carrier forming the subject-matter of this application is especially adapted to cooperate.

The cargo carrier will now be described.

The cargo carrier consists of a light metallic shell 10 of general egg-shape. Its outer surface is substantially smooth, except as hereinafter stated, and it is braced inside by suitable longitudinal and transverse braces 11 forming a cylindrical skeleton framework to provide necessary strength. The carrier has an opening in the top closed by a cover plate 12. A flange 13 surrounds this opening upon which is secured a suitable gasket 14. To the margins of the cover plate and depending therefrom is secured a frame 15 which rests on the gasket 14 around the margin of the opening. This cover plate is retained in closed position by a plurality of spring-pressed latches 16 which may be operated from the outside of the cover plate. These latches 16 are mounted in the depending frame 15 and are normally pressed outwardly by coil springs 17 (Fig. 7) and engage the underside of the flange 13 surrounding the opening in the carrier. To provide for the operation of these latches from outside the cover a depending socket 18 is secured to the underside of the cover at its center, provided with a plate 19 at its bottom having as many small openings as there are latches to be operated—there being six latches in the embodiment illustrated. Inside the socket is a plunger 20, having connected thereto, at its upper side, a pull-chain 21, by which the latches 16 are withdrawn, and which also serves as a handle to remove the cover plate 12 and as a means to hold the latches in their withdrawn position, as hereinafter described. The upper end of the socket is also closed except for an opening through which the chain 21 passes. In a depression 22 in the cover above the socket 18 there is fixed a hook 23 which is adapted to be engaged by the links 24 of the chain 21. The latches 16 are constantly urged outwardly into locking position by the coil springs 17. In order to withdraw the latches from locking position their inner ends are connected, by means of piano wires 25 (Fig. 7), to the plunger 20, the wires being guided by sections of small pipe 26 secured in the frame 15 and the bottom plate of the socket 18. A pull on the chain 21 serves to draw the plunger 20 upwardly in the socket, thus pulling on the piano wire 25 connected to the plunger at one end and to the latches at the opposite end. The latches 16 may be held in unlocked position by engaging one of the intermediate links of the chain with hook 23, and when the cover is locked the end link of the chain is engaged with said hook 23. The plunger 20 and the socket 18 in which it moves may be provided with suitable packing to prevent the entrance of dust and water.

In order conveniently to permit the cargo carrier to move on the track and into the fuselage, the carrier is provided on its sides and at diametrical points with laterally extending wings 27, these wings being adapted to engage and move on the rails 7 of the track, while the body of the carrier lies between the rails. The wings 27 are detachably connected with the shell of the carrier for reasons hereinafter stated. The structure and arrangement of the wings is shown in Figs. 3 to 6. Both wings have the same construction and are connected in the same way to the shell, and therefore but one will be described. The shell is provided along its side with a plurality of outwardly opening sockets 28, rectangular in cross-section, to receive tenons projecting from the wings 27.

Each wing is formed of a substantially flat upper plate 30, a curved lower plate 31, a plate 32 connecting the outer edges of the plates 30 and 31, and an inner plate 33 connecting the inner edges of the same, the inner plate being slightly curved to closely fit the contour of the body of the carrier. Between the upper and lower plates 30 and 31 and connecting them together are a plurality of ribs 34. These ribs 34 are extended beyond the inner edges of the wings to form tenons 35, which enter the sockets 28 in the sides of the shell. The tenons are detachably held in the sockets 28 in any suitable way, but in the embodiment shown, the walls of the sockets 28 and the tenons 35 are provided with registering apertures 36 (Fig. 6) through which passes a rod 37, having an eye 38 at its end seated in an aperture 39 in the shell of the carrier, the eye serving as a convenient means for withdrawing the rod. The rod is held, detachably, in any suitable way, but as shown in the drawings, it is held by frictional engagement with the sockets and tenons and a series of tubular members 40 fixed in the shell in alinement with the apertures 36. By engaging the eye 38 with any suitable instrument the rod may be withdrawn, whereupon, by pulling the wing laterally outward the tenons will be withdrawn from the sockets and the wing thereby freed from the shell.

As a means for holding the carrier on a suitable support for engagement by the moving aircraft, and also to insure engagement thereby, the wings are provided with pivoted arms normally extending beyond the outer edges of the wings but capable of folding within them in order to permit the carrier to enter the trap door in the fuselage. This arm, designated by 41, is pivoted to the outer edge of the wing about midway its ends, as indicated at 42. Integral with the arm 41, but on the opposite side of the pivot 42, is a short arm 43, preferably arranged to ride upon and be supported by a track 44 connected to the wing. To hold the arm normally projected from the wing, a spring 45 is suitably connected at one end, as at 46, to one of the ribs 34 of the wing, its other end being flexibly connected by means of a wire 47 to the inner end of the short arm 43, as indicated at 48. A pocket 49, formed in the outer edge of the wing, receives the arm 41 when it is forced into the folded position. The arm is slightly curved to conform to the shape of the pocket 49 in which it rests, and its lower surface is substantially flush with the lower surface of the lower wing plate 31. When the arm is folded into this pocket it is desirable to retain it there in opposition to the pull of the spring 45 tending to project it outwardly, for which purpose a spring-pressed latch 50 (Figs. 5 and 8) is set into the top of the wing in position to engage a recess 51 in the outer end of the short arm 43 when the arm 41 rests in the pocket 49. A ring 52 serves as a handle to withdraw the latch from locking position.

As above stated, the carrier is, in general, egg-shaped. More specifically stated, as illustrated in the drawings, the ends of the carrier each have a substantially spherical surface, one larger than the other, these ends being connected by a cylindrical surface flattened in one dimension, the elements of the surface, at diametrical points 90° from the wings, converging, as indicated in Fig. 4, and the elements of the surface at right angles thereto, i. e., at the points of connection with the wings, being parallel, as shown in Fig. 5. In the smaller end of the carrier a recess 53 is formed, across which extends a bar 54, which serves as a means of attachment for a hook or the like (not shown) for the purpose of handling it after it enters the fuselage. At the junction of the cylindrical surface and spherical surface forming the smaller end of the carrier and at 90° from the wings, wedge-shaped lugs 55 (Figs. 3 and 4) are provided for a purpose hereinafter explained.

While we have described a single continuous wing on each side of the carrier as a preferred embodiment, it is obvious that the wing might consist of a plurality of separate sections on opposite sides of a vertical transverse plane passing through the center of mass of the carrier.

The cargo carrier described must be supported at some distance above the ground for engagement by the aircraft. This may be done in various ways, but a suitable way is illustrated generally in Figs. 1 and 2. According to this method, four standards 56 are provided, each having a rounded lower end seated in a base member to retain it in upstanding position while permitting the upper end freedom of movement in all directions. The upper end of each standard is provided with a shallow notch 57. The opposed arms 41 of the cargo carrier rest in the notches 57 of adjacent standards, and the forward end of the carrier rests on a curved plate 58 whose ends are supported by the forward pair of standards 56. In the act of engagement of the rails 7 of the aircraft with the cargo carrier, the standards are readily pushed aside, thus releasing the carrier to the aircraft. The support for the carrier just described in general terms forms no part of this application. The forward motion of the aircraft combined with the inertia of the cargo carrier causes the latter to ride up the rails 7 through the trap door 4, but should its momentum be only sufficient to carry it partly through the trap door it will be retained there, the lugs 55 being brought into engagement with the edges of the trap door, all as described in our parent application.

While we have illustrated but one embodiment of our invention, it is obvious that the principal features may be embodied in many different forms. It is therefore to be understood that our invention comprehends all substitutions, changes, and modifications within the principles disclosed and falling within the scope of the appended claims.

What we claim is:

1. A cargo carrier adapted to be loaded into aircraft while the latter is in motion comprising a light, hollow shell having a detachable cover plate, and elongated wing members extended from the shell at substantially diametrical points.

2. A cargo carrier adapted to be loaded into aircraft while the latter is in motion comprising a light, hollow shell having a detachable cover plate, and elongated wing members extended from the shell at substantially diametrical points and detachably secured thereto.

3. A cargo carrier adapted to be loaded into aircraft while the latter is in motion comprising a light, hollow shell having a detachable cover plate, wing members extended from the shell at substantially diametrical points, and foldable supporting arms carried by the wing members.

4. A cargo carrier adapted to be loaded into aircraft while the latter is in motion comprising a light, hollow shell having a detachable cover plate, wing members extended from the shell at substantially diametrical points and comprising upper and lower plates, a supporting arm pivotally mounted intermediate its ends between the outer edges of each pair of plates, a spring connected to each wing and to the inner end of each supporting arm, and a pocket formed between each pair of plates to receive the outer ends of the supporting arms when the same are collapsed.

5. A cargo carrier adapted to be loaded into aircraft while the latter is in motion comprising a light, hollow shell, wing members extended from the shell at substantially diametrical points, and yielding arms secured to and extended from the outer edges of said wings.

6. A cargo carrier adapted to be loaded into aircraft while the latter is in motion comprising a light, hollow shell, wing members extended from the shell at substantially diametrical points, and arms pivotally secured to said wing members and extending outwardly therefrom.

7. A cargo carrier adapted to be loaded into aircraft while the latter is in motion comprising a light, hollow shell, wing members extended from the shell at substantially diametrical points, arms pivotally secured to said wing members and extending outwardly therefrom, and spring means tending constantly to force said arms into their extended position.

8. A cargo carrier adapted to be loaded into aircraft while the latter is in motion comprising a light, hollow shell, wing members extended from the shell at substantially diametrical points, foldable supporting arms carried by the wing members, and means for holding the arms in folded position.

9. A cargo carrier adapted to be loaded into aircraft while the latter is in motion comprising a light hollow shell, sockets in the sides of said shell at substantially diametrically opposed points, wing members provided with tenons adapted to enter said sockets, and detachable means for securing the tenons in said sockets.

10. A cargo carrier adapted to be loaded into aircraft while the latter is in motion comprising a light, hollow shell and wings secured to said shell at substantially diametrical points, the lower faces of said wings being curved.

11. A cargo carrier adapted to be loaded into aircraft while the latter is in motion comprising a light, hollow shell, and lugs projecting from the outer surface of the shell adjacent one end thereof and adapted to engage a part of the aircraft.

12. A cargo carrier adapted to be loaded into aircraft while the latter is in motion comprising a light, hollow shell, and means projecting laterally therefrom at substantially diametrical points and adapted to support the carrier on opposite sides of a vertical transverse plane passing through its center of mass.

Signed by us this 21st day of October, 1929.

C. HUNTINGTON JACOBS.
ASA F. HARSHBARGER.